(12) United States Patent
Lewis et al.

(10) Patent No.: US 9,430,656 B2
(45) Date of Patent: Aug. 30, 2016

(54) DEVICE FOR CARRYING OUT A CRYPTOGRAPHIC METHOD, AND OPERATING METHOD FOR SAME

(71) Applicant: ROBERT BOSCH GMBH, Stuttgart (DE)

(72) Inventors: Matthew Lewis, Reutlingen (DE);
Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/904,518

(22) Filed: May 29, 2013

(65) Prior Publication Data
US 2013/0326232 A1 Dec. 5, 2013

(30) Foreign Application Priority Data
Jun. 4, 2012 (DE) .................. 10 2012 209 404

(51) Int. Cl.
| | |
|---|---|
| G06F 21/60 | (2013.01) |
| G06F 21/12 | (2013.01) |
| G06F 21/75 | (2013.01) |
| H04L 9/00 | (2006.01) |

(52) U.S. Cl.
CPC ............ *G06F 21/602* (2013.01); *G06F 21/125* (2013.01); *G06F 21/75* (2013.01); *H04L 9/003* (2013.01); *H04L 2209/046* (2013.01)

(58) Field of Classification Search
CPC ....... G06F 21/602; G06F 21/75; G06F 21/14; G06F 21/125; H04L 9/003; H04L 2209/046; H04L 9/002; H04L 9/30; H04L 9/06; H04L 9/065; H04L 9/0625; H04L 9/0631; H04L 2209/24; H04L 2209/16; H04L 2209/08

USPC .......................................................... 713/189
See application file for complete search history.

(56) References Cited

U.S. PATENT DOCUMENTS

| | | | | |
|---|---|---|---|---|
| 7,599,488 | B2 | 10/2009 | Kocher et al. | |
| 8,065,532 | B2 * | 11/2011 | Shu ................. | G06F 9/3001 713/190 |
| 2006/0140401 | A1 * | 6/2006 | Johnson et al. ................. | 380/44 |
| 2007/0086587 | A1 * | 4/2007 | Farahat et al. ................. | 380/28 |
| 2008/0016551 | A1 * | 1/2008 | Pinkas et al. ..................... | 726/2 |
| 2008/0063192 | A1 * | 3/2008 | Goubin et al. ................. | 380/46 |
| 2008/0184346 | A1 * | 7/2008 | Pinkas et al. ..................... | 726/5 |
| 2011/0033045 | A1 * | 2/2011 | Bancel ............................ | 380/44 |
| 2012/0079281 | A1 * | 3/2012 | Lowenstein et al. .......... | 713/189 |
| 2012/0106732 | A1 * | 5/2012 | Teglia ............................. | 380/28 |
| 2012/0250854 | A1 * | 10/2012 | Danger et al. ................. | 380/28 |
| 2012/0278635 | A1 * | 11/2012 | Hars et al. ..................... | 713/193 |
| 2013/0073850 | A1 * | 3/2013 | Zaverucha ..................... | 713/168 |
| 2013/0136255 | A1 * | 5/2013 | Brown ............................. | 380/28 |

* cited by examiner

*Primary Examiner* — Don Zhao
(74) *Attorney, Agent, or Firm* — Norton Rose Fulbright US LLP (57) ABSTRACT

A device for carrying out a cryptographic method has an input interface for receiving input data, an output interface for outputting output data, and a cryptographic unit for carrying out the cryptographic method. A first functional unit is provided which is designed to convert at least a portion of the input data into transformed input data using a first deterministic method, and to supply the transformed input data to the cryptographic unit, and/or a second functional unit is provided which is designed to convert at least a portion of output data of the cryptographic unit into transformed output data using a second deterministic method, and to supply the transformed output data to the output interface.

27 Claims, 4 Drawing Sheets

$$\begin{bmatrix} b'_0 \\ b'_1 \\ b'_2 \\ b'_3 \\ b'_4 \\ b'_5 \\ b'_6 \\ b'_7 \end{bmatrix} = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \begin{bmatrix} b_0 \\ b_1 \\ b_2 \\ b_3 \\ b_4 \\ b_5 \\ b_6 \\ b_7 \end{bmatrix} + \begin{bmatrix} 1 \\ 1 \\ 0 \\ 0 \\ 0 \\ 1 \\ 1 \\ 0 \end{bmatrix}$$

Fig. 6

DEVICE FOR CARRYING OUT A CRYPTOGRAPHIC METHOD, AND OPERATING METHOD FOR SAME

CROSS REFERENCE TO RELATED APPLICATIONS

The present application claims priority to Application No. DE 10 2012 209 404.0, filed in the Federal Republic of Germany on Jun. 4, 2012, which is expressly incorporated herein in its entirety by reference thereto.

FIELD OF INVENTION

The present invention relates to a device for carrying out a cryptographic method, the device having an input interface for receiving input data and an output interface for outputting output data, and a cryptographic unit for carrying out the cryptographic method.

BACKGROUND INFORMATION

These types of devices and methods are described in U.S. Pat. No. 7,599,488, for example.

The known device has a microprocessor core with which a random number generator is associated in order to randomly manipulate the carrying out of cryptographic instructions on the microprocessor core. As a result, cryptographic attacks on the microprocessor core carrying out the cryptographic method are made more difficult. In particular, so-called differential power analysis (DPA) attacks are made more difficult as the result of obscuring the temporal relationship between a regular clock signal and the actual carrying out of the individual steps of the cryptographic method by the microprocessor core, using random numbers.

Disadvantages of the known system are the fact that a random number generator is required which is to be technically implemented only with a great level of effort, as well as a complex structure of the periphery of the microprocessor core, which influences the clock signal for the microprocessor as a function of the random numbers.

SUMMARY

Accordingly, an object of the present invention is to improve a device and a method of the type stated at the outset in such a way that the disadvantages of the related art are avoided, and at the same time enhanced security in carrying out the cryptographic method, in particular against so-called side channel attacks or DPA attacks, is achieved.

For the device of the type stated at the outset, this object is achieved according to the present invention in that a first functional unit is provided which is designed to convert at least a portion of the input data into transformed input data using a first deterministic method, and to supply the transformed input data to the cryptographic unit, and/or in that a second functional unit is provided which is designed to convert at least a portion of output data of the cryptographic unit into transformed output data using a second deterministic method, and to supply the transformed output data to the output interface, so that the relationship between the data processed by the cryptographic unit and the side channel information is obscured.

The functional units proposed according to the present invention offer the advantage that data which are not ascertainable or are ascertainable only with great difficulty, namely, for example, the transformed input data formed with the aid of the first functional unit, are supplied to the carrying out of the actual cryptographic method, i.e., to the cryptographic unit. This means that even if an attacker knows the plaintext to be encrypted with the aid of the device according to the present invention, for example, and carries out a plurality of DPA attacks, an analysis of the measuring results thus obtained is made more difficult since the first functional unit provided according to the present invention obscures a direct relationship between the carrying out of the cryptographic method steps by the cryptographic unit and the plaintext supplied to the device, namely, via a deterministic transformation.

According to the present invention, this means that as a result of eliminating the direct relationship (usually identity) between the plaintext, which represents the input variable for the device according to the present invention, and those data which are actually processed for the encryption by the cryptographic unit in the device according to the present invention (input data transformed according to the present invention), a side channel attack or DPA method in general is made significantly more difficult compared to conventional methods. An attacker may still start a plurality of DPA attacks and evaluate same, for example by correlating obtained series of measurements (for example, the variation of the electrical power consumption over time of the device). However, since the series of measurements obtained within the scope of the DPA attacks are a function, among other things, of the input data transformed according to the present invention, which are unknown to the attacker, a much greater number of measurement series or correlation operations is necessary in order to be able to draw meaningful conclusions concerning the processes in the cryptographic unit. Instead, an attacker would initially have to successfully attack, for example, the first functional unit according to the present invention, i.e., analyze the transformation implemented by the first functional unit, before he could begin a DPA attack on the cryptographic unit, which is achievable with a tolerable level of effort.

At the same time, the present invention has the further advantage that the first functional unit uses a purely deterministic method. This means that for known input data of the first functional unit, the output data to be expected may always be ascertained. Thus, in contrast to the known device, the present invention requires no complicated source of random numbers. The same applies for the second functional unit.

Due to the use of purely deterministic methods in the functional units, the functional units may be implemented in a relatively simple and efficient manner, for example in application-specific integrated circuits (ASICs). In addition, testing of the device according to the present invention is simplified by resorting to purely deterministic methods, since unambiguous test cases may be specified and tested. Implementations of the present invention in ICs or ASICs require relatively little chip surface area for the functional units on account of their deterministic character. In addition, the degree of enhanced security resulting from the functional units according to the present invention may be precisely set by the selection of the specific implementation (for example, the bit width of a secret key that is used for operating the functional units according to the present invention).

In one exemplary embodiment of the present invention, only the first functional unit is provided, which, as described above, obscures, via the first transformation, the relationship between input data and the transformed input data supplied to the cryptographic unit.

As the result of one exemplary embodiment, for example, the output data of the cryptographic unit could also be directly provided to the user of the device according to the present invention, i.e., without a comparable transformation according to the present invention of the output data.

In another exemplary variant of the present invention, it is also conceivable to directly provide the plaintext to be encrypted to the cryptographic unit, i.e., without transformation according to the present invention between the input interfaces and the cryptographic unit, and with the aid of a second functional unit to transform only the output data obtained from the cryptographic unit in order to obtain transformed output data.

However, one particularly preferred exemplary embodiment of the present invention provides maximum protection against DPA attacks, in which the first functional unit according to the present invention is provided on the input side of the cryptographic unit, and the second functional unit according to the present invention is provided on the output side of the cryptographic unit. Namely, in this case input data as well as output data for the cryptographic unit are obscured with maximum efficiency, based on the input/output data of the device itself, which may possibly be detectable from the outside.

In one particularly preferred exemplary embodiment, it is provided that the first functional unit is designed to carry out a transformation of the at least one portion of the input data as a function of at least one first secret key. The first secret key may be, for example, a binary word having a predefinable length which is preferably also directly integrated into the device according to the present invention, and therefore is not easily determinable from the outside. When the device according to the present invention is implemented in the form of an IC or ASIC, the secret key may be stored, for example, in an internal memory of the IC or ASIC, for example in such a way that the secret key is not readable at all from outside the IC, and therefore is known only to the manufacturer. The enhancement of the security against DPA attacks achieved by the present invention may be easily set by predefining the length of the secret key.

In another advantageous exemplary embodiment, it is provided that the second functional unit is designed to carry out a transformation of the at least one portion of the output data as a function of at least one second secret key, which, similarly as for the first secret key, is likewise preferably integrated into the device according to the present invention.

In yet another advantageous exemplary embodiment, it may be provided that the first secret key is identical to the second secret key.

In another advantageous exemplary embodiment, it is provided that the first and/or the second deterministic method(s) is/are based on a mathematical function, the mathematical function being injective or bijective, and the first deterministic method and the second deterministic method preferably being based on the same mathematical function.

"Injective" means that, for given input data and a given secret key, the mathematical function provides an output value which may be unambiguously associated with the input data and the secret key. This means that there are no other combinations of the input data and the secret key that provide the same output data. This type of structure of the mathematical function may be advantageously used to create a digital signature, for example. In this case, the mathematical function does not have to already be bijective, i.e., invertibly unambiguous. However, as the result of another advantageous exemplary embodiment, the mathematical function is not only injective, but also bijective, so that the input data may be unambiguously deduced from the output data of the mathematical function. This type of mathematical function may be used, for example, to use the device according to the present invention for encryption and for decryption.

In another advantageous exemplary embodiment, it is provided that the first and/or the second deterministic method(s) include(s) a transformation in which a change of one binary digit of the input data, which are usually present as a binary word having a predefinable length, or of the output data results in the change of more than one binary digit of the transformed input data or of the transformed output data, in particular the change of more than four binary digits of the transformed input data or of the transformed output data. It is thus advantageously ensured that the mathematical function itself is difficult to attack, or its functional relationship between the input data and the output data is difficult to reconstruct, thus further increasing the operational reliability of the device according to the present invention.

In another advantageous exemplary embodiment, it is provided that the cryptographic unit, the first functional unit, and the second functional unit are each implemented in an integrated circuit, preferably in the same integrated circuit (IC or ASIC or FPGA), so that the data connections between the functional units according to the present invention and the cryptographic unit are not analyzable from the outside, or are analyzable only with extreme difficulty (for example, by grinding off, microscopic examination, and the like).

The circuit may preferably be an integrated circuit, for example an application-specific integrated circuit (ASIC). Alternatively or additionally, however, the device according to the present invention may also be implemented in the form of programmable logic modules (field-programmable gate array (FPGA)).

In another advantageous exemplary embodiment, it is provided that the first functional unit and/or the second functional unit has/have a linearly fed back shift register and/or a unit for carrying out a nonlinear substitution operation. The linearly fed back shift register itself may advantageously already contain measures which make DPA attacks more difficult. For example, a symmetrical structure of the shift register may be provided with mutually complementary state transitions, etc. The nonlinear substitution operation may be, for example, the S-box method of the Advanced Encryption Standard (AES) or a comparable method.

In another advantageous exemplary embodiment, it is provided that the cryptographic unit is designed to encrypt and/or decrypt the transformed input data, in particular according to the Advanced Encryption Standard (AES).

In contrast to conventional AES cryptographic units, the device according to the present invention advantageously allows the cryptographic method steps for the AES algorithm to be carried out based on the input data transformed according to the present invention, which are not readily apparent to an attacker, in comparison to the input data, which are supplied to the input interface of the device according to the present invention.

A functional relationship between the AES method which is carried out on the cryptographic unit and the transformed output data is likewise advantageously obscured by the transformation of the output data by the second functional unit according to the present invention, so that an attack based on DPA attacks is made more difficult compared to conventional devices or methods. At the same time, the device according to the present invention has the further advantage that a relatively small number of complicated deterministic methods may be used to bring about the transformation according to the present invention of the input data or of the output data.

The principle of the present invention is not limited to methods of the AES type. Rather, the cryptographic unit may carry out one or multiple desired cryptographic primitives such as block ciphers and the like, for example, a portion of an encryption/decryption algorithm, etc. The important part is the transformation according to the present invention of the input and/or output data which are supplied to the cryptographic unit or obtained from same.

Specific exemplary embodiments of the present invention are explained below with reference to the accompanying drawings.

DETAILED DESCRIPTION

Figure 1:
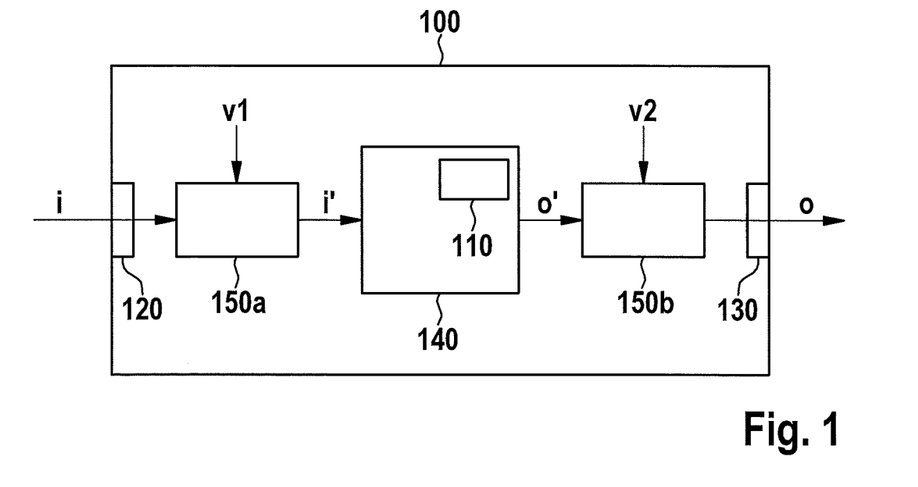
FIG. 1 schematically shows a block diagram of one exemplary embodiment of a device according to the present invention.

FIG. 1 shows a simplified block diagram of one exemplary embodiment of device 100 according to the present invention for carrying out a cryptographic method 110.

Device 100 has an input interface 120 for receiving input data i, and an output interface 130 for outputting output data o.

In addition, device 100 has a cryptographic unit 140 which is designed for carrying out a cryptographic method 110. This may be, for example, a method according to the AES standard and the like, whereby function 110 may also be designed to encrypt and also decrypt data. Cryptographic unit 140 may also be designed in such a way that it carries out (only) portions of cryptographic algorithms.

Details concerning the AES standard are available, for example, on the Internet at http://csrc.nist.gov/publications/fips/fips197/fips-197.pdf.

According to the present invention, a first functional unit 150a is provided between input interface 120 and cryptographic unit 140 which is designed to convert input data i into transformed input data i', using a first deterministic method. According to the present invention, these transformed input data i', and not input data i directly, as is the case with conventional devices, are transferred to cryptographic unit 140 as input data. It is thus advantageously ensured that DPA attacks are made more difficult due to cryptographic unit 140 carrying out cryptographic method 110 using input data i' which differ from input data i supplied by device 100, and which in particular are not ascertainable by an attacker or are ascertainable only with great difficulty. In order to attack actual cryptographic method 110, an attacker of device 100 initially must successfully attack and analyze functional unit 150a or the transformation implemented using same.

Similarly, device 100 has a second functional unit 150b which is designed to convert output data o' of cryptographic unit 140 into transformed output data o, which ultimately are supplied to output interface 130 of device 100 for output to an external unit.

Functional units 150a, 150b according to the present invention thus advantageously obscure the relationship between input data i or output data o of device 100, which are relatively easy for an attacker to ascertain, and the data which are actually processed by cryptographic unit 140 or cryptographic method 110 implemented therein. Namely, cryptographic method 110 operates on transformed input data i' and outputs output data o'. Variables i', o' are internal variables of device 100 according to the present invention which are determinable from the outside only with great difficulty, or not at all.

First functional unit 150a advantageously uses a first secret key v1 to transform input data i into transformed input data i'. First secret key v1 is advantageously integrated into device 100, and therefore is also determinable by an attacker only with great difficulty, or not at all.

Similarly, second functional unit 150b may contain a second secret key v2 in order to bring about the transformation of output data o' into transformed output data o.

Secret keys v1, v2 may also be identical.

First functional unit 150a as well as second functional unit 150b particularly preferably operate based on deterministic methods. Using first functional unit 150a as an example, this means that for known input data i and a predefined key v1, the same transformed input data i' are always obtained at the output of first functional unit 150a. The same applies for second functional unit 150b and the output data which it processes. Thus, device 100 according to the present invention advantageously requires no source of random numbers and the like, so that a space-saving and cost-effective implementation is possible using known semiconductor technologies such as CMOS technology.

To be able to successfully attack cryptographic function 110 or cryptographic unit 140, for example via a side channel attack, it is necessary to initially reconstruct the operating principle of functional units 150a, 150b according to the present invention. This may be made more difficult, in a manner known per se, by selecting a suitably large key v1, v2 (having a length of 128 bits, for example) and the like.

Figure 2A:
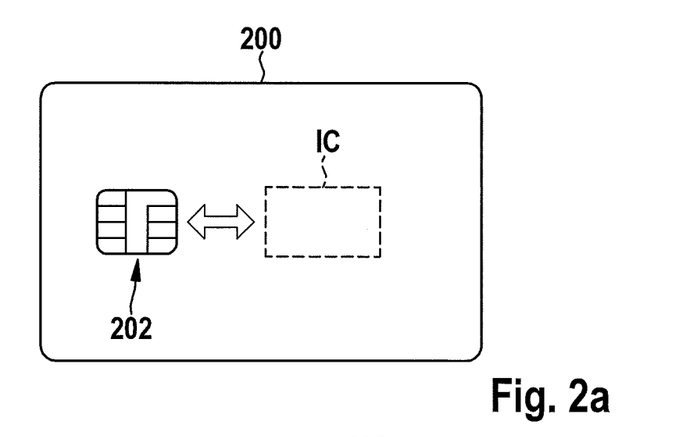
FIG. 2a schematically shows another exemplary embodiment of the device according to the present invention.

FIG. 2a shows one possible application of device 100 according to the present invention (FIG. 1). Device 100 according to FIG. 1 is integrated into an integrated circuit IC, which in turn is installed in a card-shaped carrier 200 having an external electrical contact 202. Contact 202 is used to implement input interface 120 and output interface 130 of device 100; a communication between electrical contact 202 of card 200 with the IC is indicated by the block arrow shown in greater detail in FIG. 2a. Contact 202 may be linked, for example, to a serial interface of the IC.

Thus, an attacker of card 200 may at best ascertain data i, o (FIG. 1) by analyzing interface 202, but is not able to ascertain variables i', o' which are present only internally (FIG. 1), thus making a successful attack of the cryptographic method implemented in circuit IC significantly more difficult.

Figure 2B:
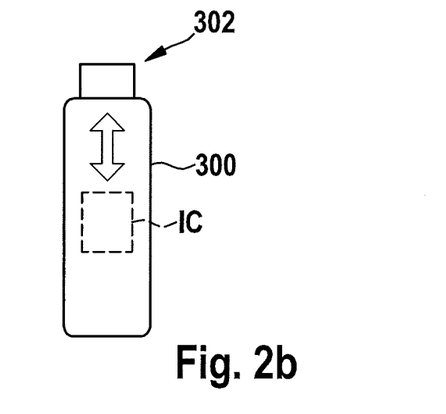
FIG. 2b schematically shows another exemplary embodiment of the device according to the present invention.

FIG. 2b shows the implementation of device 100 according to the present invention from FIG. 1, once again in the form of an integrated circuit IC, in a so-called USB stick. USB stick 300, which functions essentially as a data carrier, has an interface to an external system such as a personal computer, for example, and which in the present case is denoted by reference numeral 302 and operates according to the Universal Serial Bus (USB) standard.

Figure 3A:
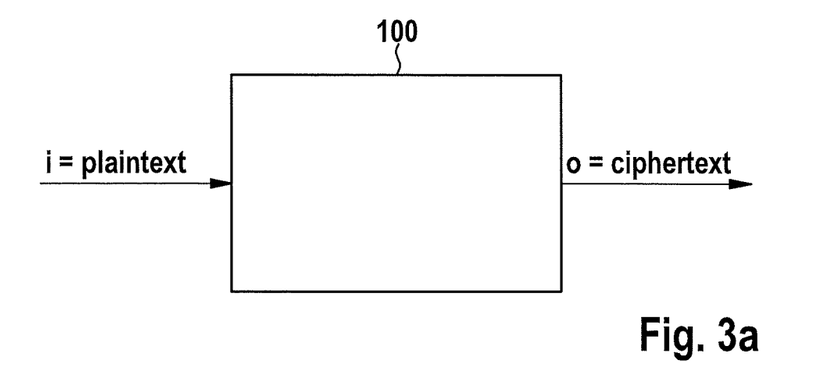
FIGS. 3a, 3b schematically show a block diagram of the device according to the present invention in different operating states.

FIG. 3a shows one exemplary embodiment of device 100 according to the present invention in a first operating state in which the device is used for encryption of plaintext, using the AES encryption method. For this purpose, the plaintext is supplied as input data i to device 100 on the input side. As described above with respect to FIG. 1, the plaintext is initially transformed into transformed input data i' by first functional unit 150a as a function of first secret key v1, and these transformed input data i' are initially supplied to cryptographic unit 140 for carrying out AES encryption method 110.

Encrypted output data o', which represent an AES-encrypted variant of transformed input data i', are supplied to second functional unit 150b, which carries out a further transformation of output data o' into transformed output data o, using second secret key v2. These transformed output data o are output as encrypted text ("ciphertext") by device 100 according to FIG. 3a.

Accordingly, only the plaintext and the ciphertext are visible to an attacker of device 100 (FIG. 3a), and a DPA attack on cryptographic unit 140 is advantageously made more difficult in that cryptographic unit 140 actually operates using input data i' and output data o', which are different from the plaintext and the encrypted text (ciphertext) due to the transformation according to the present invention by functional units 150a, 150b.

Figure 3B:
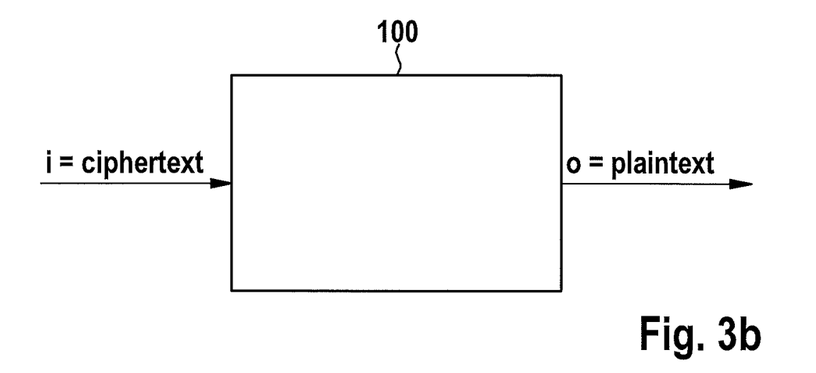

FIG. 3b shows one exemplary embodiment of device 100 in a second operating state in which the device is used for decryption of AES-encrypted data. An encrypted text (ciphertext), which thus corresponds to input data i from FIG. 1, is supplied to device 100, and the ciphertext is converted into transformed input data i' according to the above statements with respect to FIG. 1. In the present case, these transformed input data i' are decrypted by cryptographic unit 140 according to the AES standard, and the data thus decrypted are transformed with the aid of second functional unit 150b as described above before they are output as output data o, i.e., plaintext.

Variant 100 of the present invention described above, having the two functional units 150a, 150b, also advantageously provides obscuration during the decryption process of data actually processed by cryptographic unit 140 based on input data and output data i, o, respectively, which may possibly be apparent from the outside.

Figure 4:
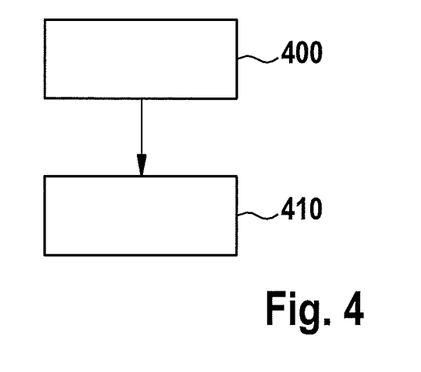
FIG. 4 shows a simplified flow chart of one exemplary embodiment of the method according to the present invention.

FIG. 4 shows a flow chart of one exemplary embodiment of the method according to the present invention. At least a portion of input data i for device 100 is converted into transformed input data i' (FIG. 1) in a first step 400, but preferably all of the input data are converted in order to achieve a maximum decorrelation between input data i and the data supplied to cryptographic unit 140 for processing. Transformed input data i' are supplied to cryptographic unit 140 (FIG. 1) in subsequent step 410.

Optionally, the transformation of output data o' to transformed output data o may also subsequently follow the above-described method (not shown in FIG. 4).

In other exemplary embodiments it is also conceivable for only one of the two functional units 150a, 150b to be provided, so that the transformation according to the present invention is carried out only on the input side or the output side of cryptographic unit 140. However, maximum protection against DPA attacks results from providing both functional units 150a, 150b in the manner illustrated in FIG. 1.

For digital signature applications, it is sufficient when mathematical functions upon which functional units 150a, 150b are based are in each case injective, i.e., deliver unambiguous output data which allow a single set of input data to be deduced. The authenticity of the digital signatures may thus be verified in a manner known per se.

For the case that encryption and/or decryption is/are to be carried out with the aid of device 100 according to the present invention, it must be ensured that the mathematical functions upon which functional units 150a, 150b are based are also bijective, so that the input data may be unambiguously deduced based on the output data ciphertext of device 100 (FIG. 3a) in combination with a decryption step according to the present invention (FIG. 3b).

Further preferred exemplary embodiments provide that components 120, 150a, 140, 110, 150b, 130 (FIG. 1) are all integrated into a single integrated circuit IC, so that in particular the data connections between components 150a, 140 and 140, 150b are not easily accessible from the outside. The functions of components 120, 150a, 140, 110, 150b, 130 may be implemented, for example, in a microcontroller or a digital signal processor, or also in an ASIC or FPGA, at least partial implementation with the aid of software, for example for the cryptographic method or the mathematical functions of units 150a, 150b, also being suitable.

In another advantageous exemplary embodiment, it is provided that the first and/or the second deterministic method(s) upon which functional units 150a, 150b are based include(s) a transformation in which a change of one binary digit of input data i or of output data o' results in the change of more than one binary digit of transformed input data i' or of transformed output data o, in particular the change of more than four binary digits of transformed input data i' or transformed output data o. It is thus ensured that sufficient decorrelation of input data i with respect to transformed input data i' takes place. The same applies for output data o', o.

The functionality of first and/or second functional unit(s) 150a, 150b may be implemented, for example, by a unit for carrying out a nonlinear substitution operation (also referred to as "substitution box" (S-box)). One possible type of representation for the function of a nonlinear substitution operation is indicated by the matrix equation in FIG. 5a. A column vector i1, which in the present case has a total of eight elements b0, ..., b7 (each one bit, for example), is apparent from FIG. 5a, and which as an example represents the input data for the nonlinear substitution operation. Column vector i1 is multiplied by matrix M, and the resulting matrix product M×i1 is subsequently additively linked to further column vector SV, which results in column vector i1', which represents the output data of the nonlinear substitution operation.

Figure 5A:
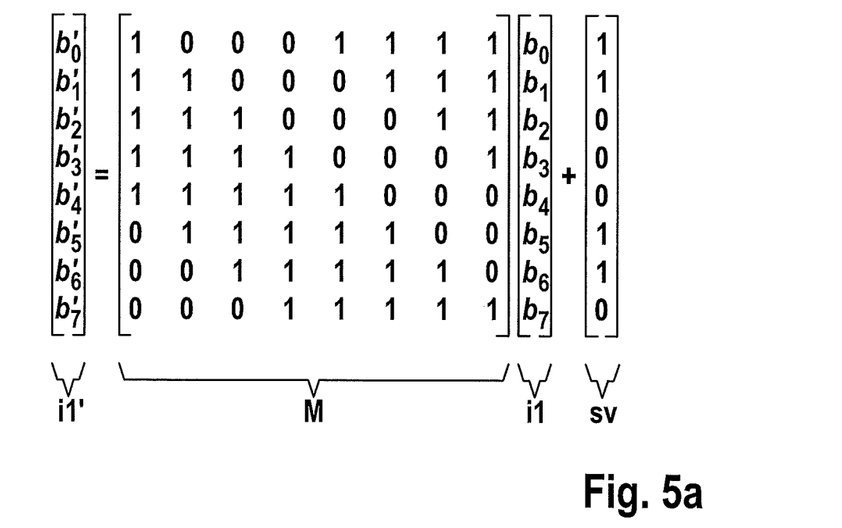
FIGS. 5a, 5b each schematically show aspects of an implementation of a functional unit according to the present invention.

In the nonlinear substitution operation illustrated in FIG. 5a, minor changes in input data i1 in only one bit position b5, for example, generally advantageously already result in significantly greater changes in output data i1', in which frequently multiple, preferably more than four, bit positions are affected.

The matrix equation depicted in FIG. 5a is provided only as an example for illustrating the principle of an S-box, and may be changed with respect to the values of elements M, SV as well as the dimensions of matrix M or involved vectors i1, SV.

A functional unit 150a and/or 150b according to the present invention having the functionality depicted in FIG. 5a may particularly advantageously be provided with a nonlinear substitution operation, it being conceivable to select at least one of the components M, SV or their elements as a function of the secret first key v1 or secret second key v2, respectively.

By using an S-box having an 8×8 matrix, it is already possible to make DPA attacks on device 100 according to the present invention significantly more difficult.

Figure 5B:
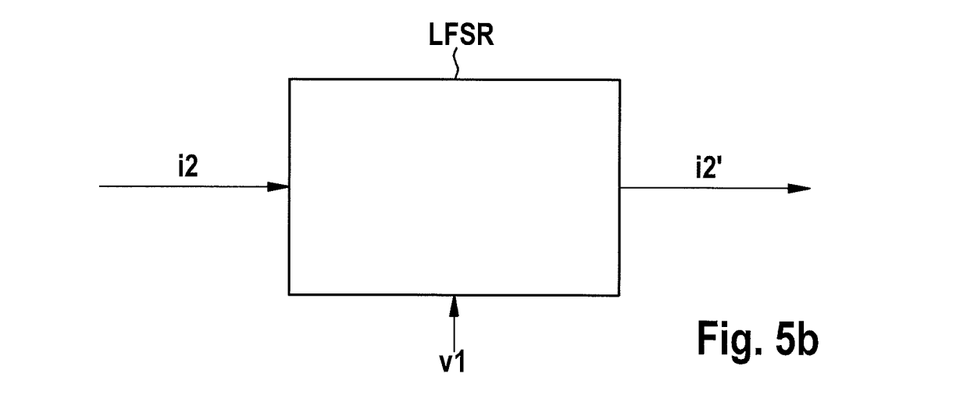

An implementation as an alternative to the S-box for the transformation by functional units 150a, 150b may advantageously have a linearly fed back shift register LFSR (see FIG. 5b). Shift register LFSR may advantageously be initialized using a bit sequence which is obtained by an exclusive OR (XOR) operation between input data i and secret key v1. This means that the result of this XOR interconnection of i2 and v1 is initially written into the cells of the shift register. As a result of the dependency of the starting value, also referred to as the "seed value," for the shift register, on input data i, which are usually non-constant, an initialization of shift register LFSR which varies over time is advantageously ensured. In general, a constant as well as a variable seed is conceivable.

Shift register LFSR may then be advantageously operated via a predefinable number of clock pulses, the state of the shift register, i.e., the bit values of its register cells, changing in a manner known per se. The binary value present in shift register LFSR according to the predefinable number of clock pulses is advantageously used as output data i2' for the respective functional unit 150a, 150b.

Advantages of the shift register-based implementation of functional units 150a, 150b are the simple technical implementation with the aid of CMOS technology, for example, and the fact that the shift register itself may also be hardened against DPA attacks with little effort, so that even an attack on functional units 150a, 150b themselves may be made more difficult.

Thus, functional units 150a, 150b proposed according to the present invention may each carry out a transformation of the data supplied to them, which are describable by an appropriate mathematical function, for example (see the S-box in FIG. 5a and shift register LFSR in FIG. 5b).

At least one two-tuple composed of input variables, namely, input data i of device 100 (FIG. 1) and secret key v1, is particularly advantageously supplied to an appropriate mathematical function f such as that upon which functional unit 150a, for example, is based. Mathematically formulated, the same thus applies for output value y of function f: $y=f(i, v1)$.

Function f, for example, is particularly advantageously selected in such a way that it achieves a sufficient "diffusion" of the bits of its input values i, v1, which is ensured, for example, by the variants according to FIGS. 5a, 5b.

Function f is particularly advantageously also injective; i.e., for each $i \neq j$, $f(i, v1) \neq f(j, v1)$ applies. It is thus ensured that a certain output value $f(i, v1)$ is obtained only for a certain set of input data i (for a given secret key v1). This property may be utilized for signature purposes.

To allow encryption and decryption of data, as the result of another exemplary embodiment, function f should also be bijective, i.e., invertibly unambiguous; i.e., for a given key v1, $y=f(i, v1)$ applies, in which case a function $f^{-1}()$ also exists such that $i=f^{-1}(y, v1)$ applies.

Figure 6:
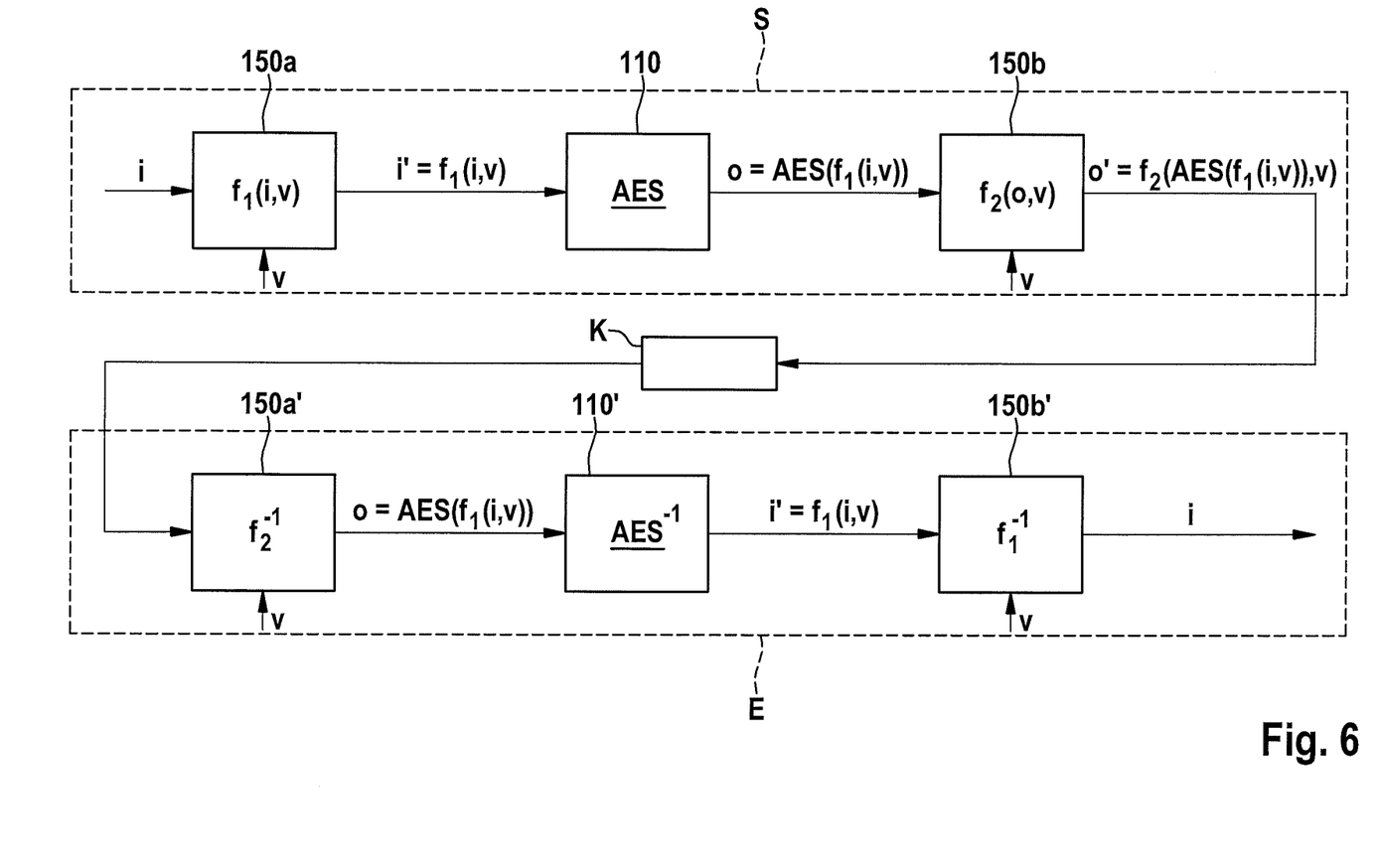
FIG. 6 shows a flow chart of one exemplary embodiment.

FIG. 6 shows a flow chart of one exemplary embodiment of the present invention in which, in a transmitter S, input data i representing a plaintext are initially supplied to a first functional unit 150a according to the present invention, which carries out a transformation of input data i into transformed input data i' on the basis of a deterministic method, for example using an S-box (FIG. 5a) or a linearly fed back shift register (FIG. 5b). In the present case, the deterministic method is represented by first mathematical function $f_1(i, v)$. Transformed input data i' are accordingly obtained for $i'=f_1(i, v)$, where v represents a secret key.

Transformed input data $i'=f_1(i, v)$ are subjected to an AES encryption 110, as the result of which AES-encrypted output data $o=AES(f_1(i, v))$ are obtained. These output data are supplied to a second functional unit 150b, which forms transformed output data $o'=f_2(AES(f_1(i, v)), v)$ therefrom on the basis of a second mathematical function $f_2(o, v)$. These transformed output data o' are subsequently encrypted according to the present invention, and may be transmitted by transmitter S over an unsecured communication channel K, for example.

A receiver E receives transformed output data o' and supplies them to a further functional unit 150a' according to the present invention, which in the present case implements an inverse function $f_2^{-1}()$ with respect to second mathematical function $f_2(o, v)$. An output signal $o=AES(f_1(i, v))$ is thus obtained at the output of further functional unit 150a' according to the present invention which is still AES-encrypted. This output signal o, which corresponds to the output signal of AES block 110 of transmitter S, is AES-decrypted in receiver E by an inverse AES block 110' of receiver E, as the result of which decrypted data $i'=f_1(i, v)$ are obtained. These AES-decrypted data i' are converted back into plaintext i by a further functional unit 150b' with the aid of inverse function $f^{-1}()$.

For simplification, in the above-described example the same keys v have been used in the two units 150a, 150b and 150a', 150b'. However, according to the description for FIG. 1, different secret keys may also be used in 150a, 150b.

Transmitter S as well as receiver E are advantageously DPA-hardened by the principle of functional unit(s) 150a, . . . according to the present invention.

It is conceivable for one exemplary embodiment of device 100 according to the present invention (FIG. 1) to be able to implement the functionality of both groups of components 150a, 110, 150b and 150a', 110', 150b', so that transmitter S as well as receiver E may have identical devices 100 according to the present invention which, depending on the application (transmission, reception), have different operating modes for implementing the particular functions.

As stated above, cryptographic unit 140 (FIG. 1) may be designed, for example, to carry out a cryptographic primitive, for example a block code, although it is also possible to implement a complete encryption algorithm or decryption algorithm (of the AES type, for example).

In order to attack the cryptographic primitive in cryptographic unit 140, an attacker must initially extract secret key v1, v2 to consequently successfully attack the mathematical function upon which functional units 150a, 150b are based. As long as secret key v1, v2 is unknown, and therefore variables i', o' processed according to the present invention are not ascertainable by the attacker, the attacker is not able to attack keys v1, v2. Therefore, the attacker is also not able to start a successful side channel attack on cryptographic unit 140.

In another advantageous exemplary embodiment, it may be provided that device 100 has an additional logic system (not shown) which recognizes errors in the processing of the deterministic methods by functional units 150a, 150b, and, for example, shuts down cryptographic unit 140 since in this case a manipulation attempt has been deduced.

With regard to their implementation, functional units 150a, 150b proposed according to the present invention may be combined with DPA-hardening methods already known in order to further enhance the security.

As a whole, device 100 according to the present invention has an enhanced security against DPA attacks, since due to the transformation(s) implemented by functional unit(s) 150a, 150b, many more hypotheses must be tested within the scope of a DPA analysis than with conventional systems.

Furthermore, the enhancement of the security achieved according to the present invention may advantageously be very easily scaled by enlarging the "data width" of the transformation(s) or the underlying mathematical functions which are implemented by functional unit(s) 150a, 150b. For a data width of function $f_1$, $f_2$ of 128 bits, for example, an attacker must test 2^128 DPA hypotheses, which is not achievable using computing power that is available at the present time and at least in the near future.

What is claimed is:

1. A hardware device, comprising:
an electronic input interface;
an electronic output interface; and
cryptographic processing circuitry;
wherein the device is configured to:
  convert at least a portion of binary digit input data received via the electronic input interface into transformed input data using a first deterministic method to ensure a first digital decorrelation, the first digital decorrelation being of the binary digit input data with respect to the transformed input data;
  provide the transformed input data as an initial input to the cryptographic processing circuitry;
  apply an encryption or decryption algorithm to the transformed input data by the cryptographic processing circuitry, thereby producing encrypted or decrypted output data, respectively;
  using a second deterministic method, transform at least a portion of the encrypted or decrypted output data, which is generated by the applying, by the cryptographic processing circuitry, of the encryption or decryption algorithm to the transformed input data into transformed output data to ensure a second digital decorrelation, the second digital decorrelation being of the output data with respect to the transformed output data; and
  output the transformed output data via the output interface.

2. The device as recited in claim 1, wherein the conversion into the transformed input data includes transforming the at least the portion of the binary digit input data as a function of at least one secret key.

3. The device as recited in claim 1, wherein the transformation into the transformed output data includes transforming the at least the portion of the encrypted or decrypted output data as a function of at least one secret key.

4. The device as recited in claim 1, wherein the first and second deterministic methods are based on a same mathematical function.

5. The device as recited in claim 4, wherein the mathematical function is an injective or bijective function.

6. The device as recited in claim 1, wherein the first deterministic method includes a transformation in which a change of one binary digit of the binary digit input data results in a change of more than one binary digit of the transformed input data.

7. The device as recited in claim 1, wherein the cryptographic processing circuitry and processing circuitry for performing each of the transformation and the conversion are implemented in respective integrated circuits or in a same integrated circuit.

8. The device as recited in claim 1, wherein the device further comprises at least one linearly fed back shift register used by the device for at least one of the conversion of the input data and the transformation of the output data.

9. The device as recited in claim 1, wherein the encryption or decryption is performed according to an Advanced Encryption Standard.

10. The device as recited in claim 1, wherein at least one of the conversion of the binary digit input data and the transformation of the output data includes carrying out a nonlinear substitution operation.

11. The device as recited in claim 1, wherein the second deterministic method includes a transformation in which a change of one binary digit of the encrypted or decrypted output data results in a change of more than one binary digit of the transformed output data.

12. The device as recited in claim 1, wherein the first and second deterministic methods are each based on an injective or bijective mathematical function.

13. The device as recited in claim 1, wherein the first deterministic method is based on an injective or bijective mathematical function.

14. The device as recited in claim 1, wherein the second deterministic method is based on an injective or bijective mathematical function.

15. The device as recited in claim 1, wherein the transformed input data is encrypted, and wherein the input data is recoverable from the transformed output data.

16. The device as recited in claim 1, wherein the transformed input data is decrypted, and wherein the transformed output data corresponds to data recovered from the binary digit input data, which is encrypted prior to receipt at the input interface.

17. The device as recited in claim 1, wherein the transformed output data is different, by at least the second digital decorrelation, than output data which corresponds to application of the encryption or decryption algorithm to the binary digit input data.

18. A cryptographic method performed by a hardware device, the device including an electronic input interface, an electronic output interface, and processing circuitry, the method comprising:
  converting, by the processing circuitry, at least a portion of binary digit input data received via the electronic input interface into transformed input data using a first deterministic method to ensure a first digital decorrelation, the first digital decorrelation being of the binary digit input data with respect to the transformed input data;
  providing the transformed input data as an initial input to an encryption or decryption algorithm executed by the processing circuitry;
  applying the encryption or decryption algorithm to the transformed input data by the processing circuitry, thereby producing encrypted or decrypted output data, respectively; and
  using a second deterministic method, converting, by the processing circuitry, at least a portion of the encrypted or decrypted output data, produced by the applying of the encryption or decryption algorithm, into transformed output data to ensure a second digital decorrelation, the second digital decorrelation being of the output data with respect to the transformed output data; and
  outputting the transformed output data via the output interface.

19. The method as recited in claim 18, wherein the conversion into the transformed input data includes a transformation of the at least the portion of the binary digit input data as a function of at least one secret key.

20. The method as recited in claim 18, wherein the conversion into the transformed output data includes a transformation of the at least the portion of the encrypted or decrypted output data as a function of at least one secret key.

21. The method as recited in claim 18, wherein the first and second deterministic methods are based on a same mathematical function.

22. The method as recited in claim 21, wherein the mathematical function is an injective or bijective function.

23. The method as recited in claim 18, wherein at least one of the conversion of the binary digit input data and the conversion of the encrypted or decrypted output data includes using a linearly fed back shift register.

24. The method as recited in claim 18, wherein at least one of the conversion of the binary digit input data and the conversion of the encrypted or decrypted output data includes carrying out a nonlinear substitution operation.

25. The method as recited in claim 18, wherein the first and second deterministic methods are each based on an injective or bijective mathematical function.

26. The method as recited in claim 18, wherein the first deterministic method is based on an injective or bijective mathematical function.

27. The method as recited in claim 18, wherein the second deterministic method is based on an injective or bijective mathematical function.

\* \* \* \* \*